United States Patent
Lovett

(10) Patent No.: US 9,482,270 B2
(45) Date of Patent: Nov. 1, 2016

(54) BEARING WEAR DETECTION DEVICE

(71) Applicant: Shane Lovett, Somerset (GB)

(72) Inventor: Shane Lovett, Somerset (GB)

(*) Notice: Subject to any disclaimer, the term of this patent is extended or adjusted under 35 U.S.C. 154(b) by 0 days.

(21) Appl. No.: 14/236,870

(22) PCT Filed: Oct. 2, 2012

(86) PCT No.: PCT/IB2012/055274
§ 371 (c)(1),
(2) Date: Feb. 3, 2014

(87) PCT Pub. No.: WO2013/018078
PCT Pub. Date: Feb. 7, 2013

(65) Prior Publication Data
US 2014/0190394 A1    Jul. 10, 2014

(51) Int. Cl.
| | |
|---|---|
| *G01N 3/56* | (2006.01) |
| *G01N 19/02* | (2006.01) |
| *F16J 3/00* | (2006.01) |
| *F16J 9/00* | (2006.01) |
| *F16J 15/00* | (2006.01) |
| *F16C 17/24* | (2006.01) |
| *G01M 13/04* | (2006.01) |
| *F16C 9/06* | (2006.01) |
| *F16C 9/04* | (2006.01) |

(52) U.S. Cl.
CPC .............. *F16C 17/246* (2013.01); *F16C 9/06* (2013.01); *G01M 13/04* (2013.01); *F16C 9/04* (2013.01)

(58) Field of Classification Search
None
See application file for complete search history.

(56) References Cited

U.S. PATENT DOCUMENTS

| | | | | |
|---|---|---|---|---|
| 3,845,735 A | | 11/1974 | Bossler, Jr. | |
| 3,897,116 A | * | 7/1975 | Carpenter | G01N 3/56 200/61.4 |
| 4,063,786 A | * | 12/1977 | Rall | F16C 19/52 340/682 |
| 4,576,499 A | * | 3/1986 | Smith | F16C 11/0671 403/138 |
| 4,749,299 A | * | 6/1988 | Swanson | F16C 11/086 16/208 |

(Continued)

FOREIGN PATENT DOCUMENTS

WO    2013/018078 A2    2/2013

OTHER PUBLICATIONS

PCT International Search Report, Feb. 7, 2013.

*Primary Examiner* — Michael A Lyons
*Assistant Examiner* — Jermaine Jenkins
(74) *Attorney, Agent, or Firm* — Crose Law LLC; Bradley D. Crose

(57) ABSTRACT

Devices to measure bearing wear are known for bearings such as rod-ends, wherein the rod-end must either be removed completely from its installed position or relocated relative to the device each time wear in a different axis is to be measured. Such devices also tend to be relatively large and cumbersome. The present invention provides a device 10 which is a fully portable light-weight apparatus that precisely measures bearings in two axes. When employed for the purpose of assessing bearing wear, the invention is capable of obtaining the measurement in confined spaces, without the need to remove the bearing from its fully installed position or reorient the bearing housing to facilitate both measurements. By using the disclosed apparatus, a user may ascertain the serviceability of a bearing by detecting the level of wear in the bearing allowing timely replacement and/or repair.

10 Claims, 6 Drawing Sheets

(56) References Cited

U.S. PATENT DOCUMENTS

| | | | | |
|---|---|---|---|---|
| 5,198,763 A * | 3/1993 | Konishi | ............... | G01B 7/02 250/231.13 |
| 5,244,287 A * | 9/1993 | Yoshikawa | ............. | F16C 17/24 384/448 |
| 6,312,226 B1 * | 11/2001 | Senior, Jr. | ............... | F04D 13/08 374/121 |
| 6,617,731 B1 * | 9/2003 | Goodnick | ........... | F04D 29/0413 310/90 |
| 2009/0205404 A1 | 8/2009 | Swadling | | |
| 2013/0031795 A1 * | 2/2013 | Lovett | ................... | G01M 13/04 33/517 |

* cited by examiner

BEARING WEAR DETECTION DEVICE

The present invention relates generally to a bearing wear measurement device and a method of measuring the wear in bearings and finds particular, although not exclusive, utility with rod-ends.

The device may be known as a "Rod End Wear Detection Device" (REWDD).

A rod-end bearing, also known as a heim joint or rose joint, is a mechanical articulating joint. Such joints are used on the ends of control rods, steering links, tie rods, or anywhere a precision articulating joint is required. In certain applications, such as aircraft, the rod-end bearings must be monitored for signs of fatigue, wear or damage where failure of the equipment can have catastrophic consequences.

Wear-indicating rod-ends have been trialled in the past (USAAMRDL-TR-76-14 Kaman Aerospace Corporation, Old Windsor Road, Bloomfield, Conn. 06002, USA). It is known to permanently trap a measuring pin in a bushing which is welded in place in the bearing outer race. The pin is restricted from moving outward by a shoulder which contacts the welded bushing and from moving inward by contact with the spherical ball. The inner surface of the pin coincides with the inner surface of the bearing liner. The pin will be worn the same amount as the bearing liner. The top of the pin protrudes above the adjacent outer surface of the rod end bearing. The long axis of the pin coincides with the long axis of the rod end bearing, which is the axis of applied load and greatest wear.

At the time of manufacture the ball is loaded into intimate contact with its spherical seat on the side toward the pin. The protruding portion of the pin is machined off until the pin height above the adjacent surface is equal to or slightly less than the allowable internal clearance.

U.S. Pat. No. 3,845,735 and U.S. Pat. No. 4,509,364 also describe apparatus for the measurement of bearing wear. However, none of the aforementioned inventions are capable of providing wear measurement in both the axial and radial directions without permanent modification to the rod end. As shown above, none of the prior inventions are able to provide accurate wear measurement without the requirement to permanently modify the subject bearing.

In one aspect, the invention provides a bearing wear measurement device for measuring the movement, due to wear, between a bearing and a bearing housing, the device comprising a body, partially enclosing a controllably movable indicator plate, an expanding mandrel mountable on the indicator plate for the securing of the bearing, the axis of the mandrel defining an axial direction, a radial direction being perpendicular to the axial direction, a clamping means for securing the bearing housing relative to the device, an indicator for displaying the movement of the indicator plate relative to the body, first controls for substantially restricting or allowing movement of the mandrel and therefore the indicator plate relative to the body in either or both axial and radial directions, and second controls for moving the indicator plate relative to the body in both the axial and radial directions, said movement being indicated on the indicator to provide a measurement of the axial and radial distance in movement between the bearing and the bearing housing.

The device is an apparatus designed for the measurement of bearing wear in two axes, including but not limited to, measurement of rod-end bearing wear in both the radial and axial directions. A rod-end bearing is a mechanical articulating joint used where a precision articulating joint is required, such as the ends of control rods, steering links, or tie rods. In certain applications, such as aircraft, the rod-end bearings must be monitored for signs of fatigue, wear or damage where failure of the equipment can have catastrophic consequences.

The objectives of the invention are the quantifiable detection of wear in a bearing such as a rod-end or rolling element bearing, the wear to be detected in a bearing in two orthogonal orientations, the ability to quantifiably detect wear in a bearing in two directions without a requirement to permanently modify or deform the bearing, the ability to quantifiably detect wear in a bearing in two directions without a requirement to reorient the rod-end, to allow such quantifiable wear in both the axial and radial direction to be measured using a single indicator, and to allow the use of the device on any rod-end or rolling element bearing.

The disclosed apparatus allows measurements of wear in bearings to within one one-thousandth of an inch (0.02 mm) to be taken in the radial and axial directions. When employed for the measurement of rod ends, the apparatus is capable of taking measurements in confined spaces, without the requirement to completely remove the link from its installed position and without the need to reorient the rod end to facilitate both axial and radial measurements. By using the disclosed apparatus a user may ascertain the serviceability of a rod-end by detecting the level of wear in the rod-end bearing allowing timely replacement and/or repair.

The mandrel may be an expanding mandrel.

The device may be arranged to measure wear without permanently deforming the subject bearing or bearing housing.

The device may be arranged to measure wear in both axial and radial directions with the bearing housing in the same position relative to the device.

The indicator may be arranged to show wear measurements with a tolerance of 0.02 mm in both the axial and radial directions.

The indicator plate may include an indicator interface, an axial actuator receptacle, a radial actuator receptacle, a radial lock receptacle and an axial lock receptacle.

The indicator interface may be a surface arranged at one end of the indicator plate at an angle between 25 and 65 degrees relative to the axis of the mandrel. The angle may be 45 degrees.

The clamping means may include an insert to prevent damage to the bearing housing.

The second controls may include an axial actuator comprising an eccentric cam arranged to operate the movement of the indicator plate within the body of the device in the axial direction.

The second controls may include a radial actuator comprising an eccentric cam arranged to operate the movement of the indicator plate within the body of the device in the radial direction.

In a second aspect, the invention provides a method of measuring wear in a bearing, the method comprising the steps of providing a device according to the first aspect; providing a bearing having a bearing housing, to be measured; placing the mandrel in the bearing and expanding it until the mandrel cannot move relative to the bearing; clamping the bearing housing in the clamping means; operating the first controls so the indicator plate can move in an axial direction but not in a radial direction; operating the second controls to move the indicator plate in the axial direction such that the distance between the two extremes of movement of the bearing relative to the bearing housing in the axial direction is indicated on the indicator.

The method may further comprise the steps of operating the first controls so the indicator plate can move in a radial direction but not in an axial direction; operating the second controls to move the indicator plate in the radial direction such that the distance between the two extremes of movement of the bearing relative to the bearing housing in the radial direction is indicated on the indicator.

The use of the term "bearing" includes rod-ends, roller bearings, needle roller bearings and taper roller bearings. The disclosed device may be relatively light-weight, portable and require no modification to the bearing to provide accurate measurements of wear in two axes. It may include, but not be limited to, measurement of rod-end bearing wear in both the radial and axial directions. The device may be capable of taking measurements to one one-thousandths of an inch (0.02 mm) without the need to reorient or permanently modify the subject bearing.

In use, the inner element of a bearing to be tested may be placed on an expanding mandrel and the external element clamped to hold the bearing perpendicular to the expanding mandrel, which is then secured to the internal indicator plate such that the relative movement between the fixed and moving elements of the bearing may then be measured.

An eccentric cam may be utilized to operate the movement of a plate within the device in either the axial or radial direction. The plate may transfer the motion of the bearings' free play to an indicator displaying the relative movement between internal and external elements of the bearing.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
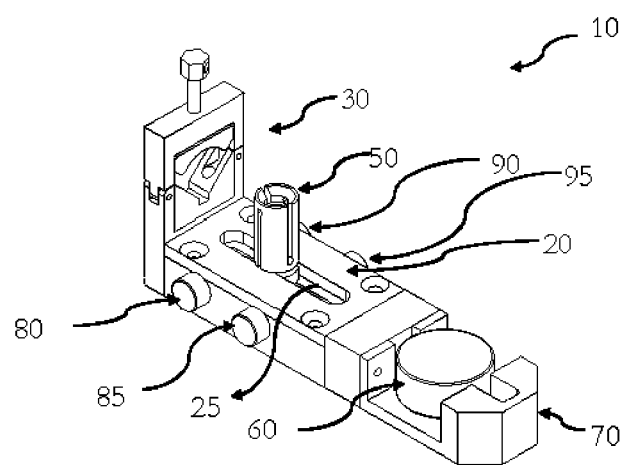
FIG. 1 is a perspective view of one embodiment of the device from one side, without a bearing being tested.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may refer to different embodiments. Furthermore, the particular features, structures or characteristics of any embodiment or aspect of the invention may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may, in some embodiments, mean only one.

The invention will now be described by a detailed description of several embodiments of the invention. It is clear that other embodiments of the invention can be configured according to the knowledge of persons skilled in the art without departing from the underlying concept or technical teaching of the invention, the invention being limited only by the terms of the appended claims.

In FIG. 1, the device 10 comprises a substantially rectangular slab-shaped body. At on end an upstanding clamp part 30 is arranged such that the clamp may accept parts of rod-ends to be tested. At the other end an indicator 60 is provided with an indicator guard 70 at its most distal end (relative to the clamp part 30). The guard 70 acts to protect the indicator from accidental knocks. The indicator may have a digital display. It includes a pin the movement of which in and out of the indicator is shown in appropriate on the display.

Within the body 20, which is hollow, an indicator plate 40 is provided. This is described in more detail below. Access to the indicator plate 40 is provided via various apertures arranged in the body 40. One such aperture is a linear slot 25 arranged in the upper surface of the body 20. A correspondingly located slot (not shown) may be provided in the opposite lower surface of the body. A mandrel 50 is releasably attached to the indicator plate 40 through this slot 25. In the embodiment shown the mandrel 50 is an expandable mandrel. This means that the diameter of the mandrel may be increased or decreased as required (typically by relative rotation of the various parts of the mandrel). To achieve this, a knob may be located at the distal end of the mandrel 50 (distal from the shown upper end). The knob may be located outside of the body 20 and underneath the body 20 as shown.

Other apertures in the body 20 allow for various controls to interact with the indicator plate 40. For instance, an axial actuator 80, an axial axis lock 85, a radial axis lock 90 and a radial actuator 95 are shown. These are knobs provided on the two sides of the body perpendicular to the upper surface through which the slot 25 extends.

Figure 2:
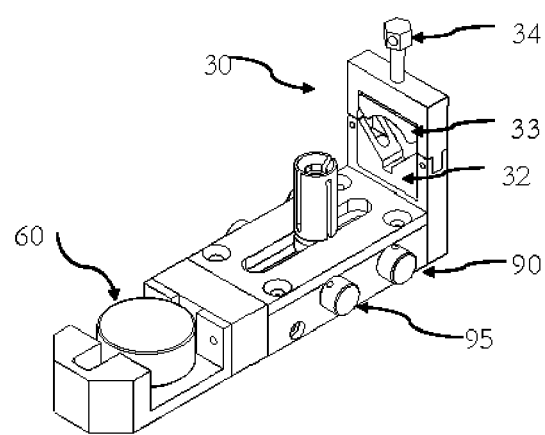
FIG. 2 is a perspective view of the device of FIG. 1 viewed from the opposite side.

In FIG. 2, various features are referenced with the same numerals as with regard to FIG. 1 and therefore no further description is provided. However, the clamp 30 is shown to include two halves 32, 33 which may be moved towards and away from one another as required. Their relative movement is effected by rotation of a knob 34 located at the top of the upstanding clamp portion 30. The upper and lower halves 32, 33 may be shaped to accommodate particularly shaped articles. The clamp 30 shown in FIG. 2 has 'V' shaped upper and lower parts 32, 33 to accommodate substantially cylindrical members such as threaded bars.

Figure 3:
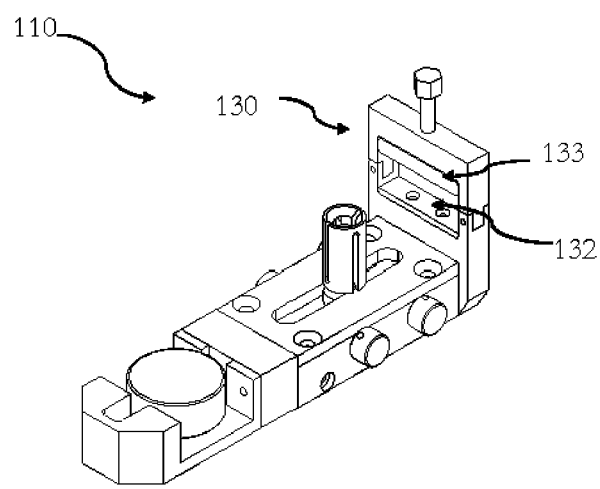
FIG. 3 is a perspective view from the same view point as FIG. 2 but in an alternative embodiment.

Another alternative of the device 110 is shown in FIG. 3 where the clamp 130 includes relatively flat shaped upper and lower halves 132, 133 to accommodate objects which include at least two substantially parallel sides.

Other clamping surfaces may be utilised and the interchangeability of the jaws may provide suitable height adjustment for varying rod-end designs and offsets.

The upper and lower parts 32, 33, 132, 133 may include, or may be, protective in nature such that they do not damage the member being clamped. For instance they may include inserts comprising material such as nylon.

Figure 4:
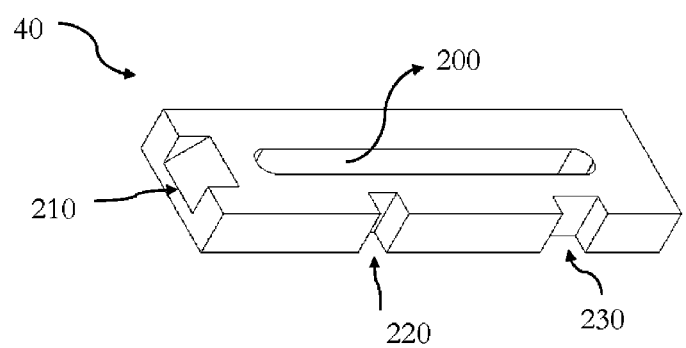
FIG. 4 is a perspective view of one embodiment of the indicator plate from one side.

In FIG. 4, the indicator plate 40 is shown. The slot 200 which corresponds with the slot 25 in the body 30 is visible running along the centre of the upper surface. This slot 200 extends right through the indicator plate 40 from the upper surface to the lower surface (not shown).

The indicator interface 210 is shown at one end of the indicator plate 40. It is a bevelled surface. In other words, it is a planar surface which lies at an angle to the plane in which the upper surface of the indicator plate lies. The angle between the plane of the indicator interface surface 210 and the plane in which the upper surface of the indicator plate 40 lies is substantially 45 degrees, although other angles are possible depending on how the device is to be used. For instance, it may lie in the range 25 to 65 degrees.

Along the side of the indicator plate 40 (the side lying in a plane perpendicular to the upper surface of the indicator plate) are provided two notches 220, 230. These notches are substantially parallelepiped in shape and have sides substantially parallel to the six major sides of the indicator plate 40. The notch 230 is slightly larger than the notch 220.

Notch 220 is the radial actuator receptacle and allows the plate 40 to be moved backwards and forwards relative to the body 20 in a direction substantially parallel to the plane of the upper surface of the body 20 and plate 40. This is effected by a cam (not shown) which sits inside the notch and is rotated by the knob 95. The cam, as it is rotated, variously presses against either side of the notch to urge it one way or the other. An example of a cam could be an off-set or eccentric cam.

Notch 230 is the radial lock receptacle and allows the plate 40 to be locked such that it cannot move in a direction substantially parallel to the plane of the upper surface of the body 20 and plate 40. This may be effected by a member (not shown) which is movable into and out of the notch by the knob 90. The member may be square in shape such that when inserted into the notch its lateral sides press against both sides of the notch. When removed from the slot the plate may be allowed to move relative to the body. Another possibility is a cam which, as it is rotated, variously presses against either both sides of the notch to prevent its movement one way or the other, or disengages from both sides allowing the plate to move relative to the body in a direction parallel to the plane of the upper surface of the body 20 and plate 40. One example of a cam could have a rhomboid shaped member, although other shapes are contemplated.

Figure 5:
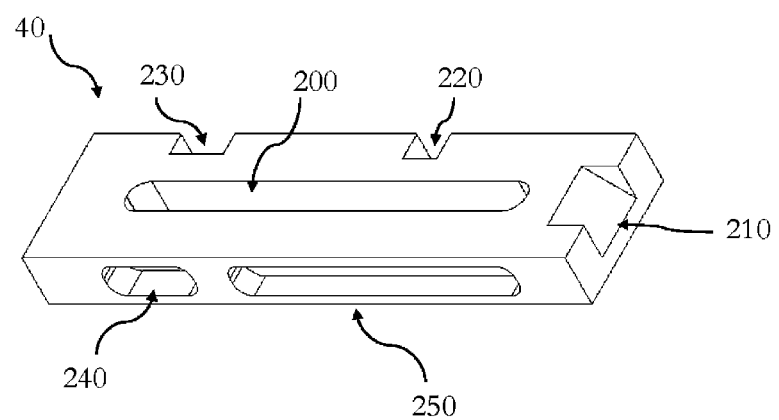
FIG. 5 is a perspective view of the indicator plate of FIG. 4 viewed from the opposite side.

In FIG. 5, the other side of the indicator plate 40 is shown. The slot 200 which corresponds with the slot 25 in the body 30 is visible running along the centre of the upper surface.

Along the other side of the indicator plate 40, opposite to the side described with reference to FIG. 4, (the side lying in a plane perpendicular to the upper surface of the indicator plate) are provided two slots 240, 250. These slots extend radially into the plate and are substantially linear in form with upper and lower surfaces substantially parallel to one another, and substantially parallel to the upper and lower surfaces of the plate 40, and with rounded ends. The slot 250 is longer than the slot 240.

Slot 240 is the axial actuator receptacle and allows the plate 40 to be moved up and down relative to the body 20 in a direction perpendicular to the plane of the upper surface of the body 20 and plate 40. This is effected by a cam (not shown) which sits inside the slot and is rotated by the knob 80. The cam, as it is rotated, variously presses against either upper or lower surface of the slot to urge it one way or the other. An example of a cam could be an off-set or eccentric cam.

Slot 250 is the axial lock receptacle and allows the plate 40 to be locked such that it cannot move in a direction substantially perpendicular to the plane of the upper surface of the body 20 and plate 40. This may be effected by a member (not shown) which is movable into and out of the slot 250 by use of the knob 85. The member may have a shape and size (e.g. rectangular) such that when it is inserted into the slot 250 its upper and lower surfaces rest against the respective lower and upper inside surfaces of the slot 250. When removed from the slot the plate may be allowed to move relative to the body. Another possibility is that the member is a cam which, as it is rotated, variously presses against either both upper and lower surfaces of the notch to prevent its movement one way or the other, or disengages from both surfaces allowing the plate to move relative to the body in a direction substantially perpendicular to the plane of the upper surface of the body 20 and plate 40. One example of a cam could have a rhomboid shaped member, although other shapes are contemplated.

Figure 6:
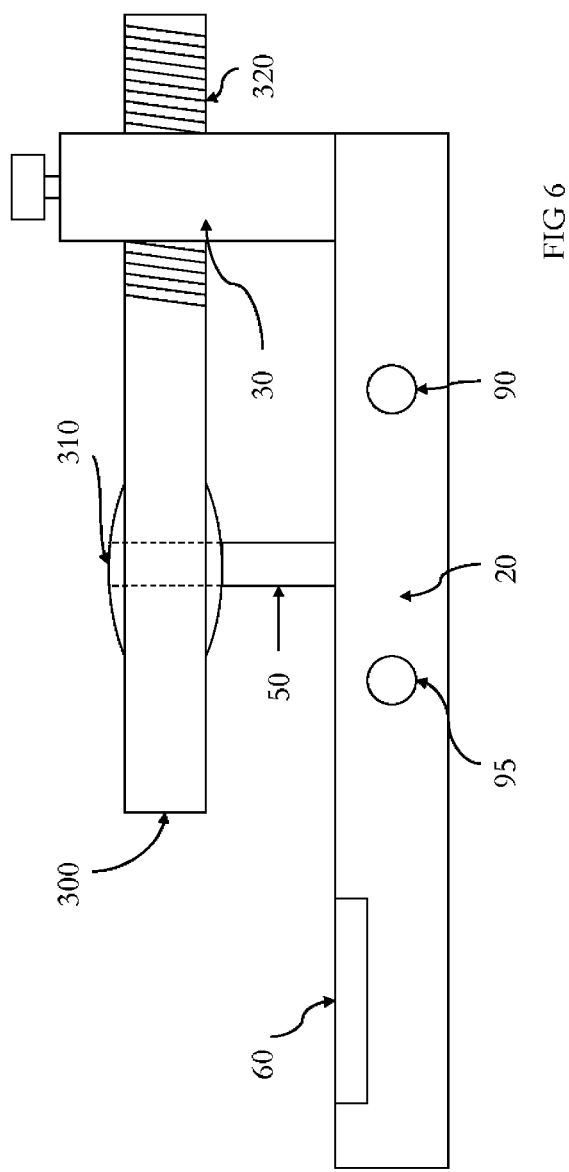
FIG. 6 is a side view of the device including a rod-end to be tested.

FIG. 6 shows the device 10 with a rod-end 300 to be tested. The rod-end includes a ball-type joint located in a bearing race within the body of the rod-end. The ball-type joint includes an axial aperture into which the mandrel 50 has been located and expanded to lock tightly therein. The mandrel within the ball-type joint is indicated in broken lines. The body (or shaft) of the rod-end includes a threaded end 320 which has been clamped in the clamp 30. The mandrel locks the internal element of the bearing whilst the clamp locks the external elements of the bearing. The mandrel is then secured, if not already, to the internal indicator plate 40 such that the relative movement between the fixed and moving elements of the bearing may then be measured.

When positioned in the device 10 the wear in one axis of the bearing may be measured by means of locking the radial movement of the plate 40 relative to the body 20 by means of knob 90 and then moving the plate, and thus the mandrel and ball-type joint within the race, by means of rotation of the knob 95. The movement of the plate 40 moves the pin (not shown) which projects from the indicator 60 by means of the indicator interface 210. The range of movement may be read-out from the display of the indicator.

In a similar manner, the wear in another (perpendicular) axis of the bearing may be measured by means of locking the axial movement of the plate 40 relative to the body 20 by means of knob 85 and then moving the plate, and thus the mandrel and ball-type joint within the race, by means of rotation of the knob 85. The movement of the plate 40 moves the pin (not shown) which projects from the indicator 60 by means of the indicator interface 210. The range of movement may be read-out from the display of the indicator.

The plate 40 transfers the motion of the bearing's free play to the indicator (or transducer and digital display) displaying the relative movement between internal and external elements of the bearing. The design of the plate 40 is such that both axial and radial motions are transmitted to the indicator by the use of a precision machined angle on the plate (the indicator interface 210) and a corresponding contact (or pin) on the indicator. Thus both axial and radial clearances of the subject bearing are able to be precisely measured without the need of additional indicators.

In this way, the wear in two substantially perpendicular axes may be measured with the test-piece 300 in the same locked position relative to the device 10 (i.e. without the need to reposition the test-piece relative to the device 10).

When employed for the purpose of assessing rod-end bearings, the device is capable of obtaining the measurement in confined spaces, without the need to remove the rod end from its fully installed position or reorient the rod-end to facilitate measurements in more two substantially perpendicular axes.

Devices to measure bearing wear are known for bearings such as rod-ends, wherein the rod-end must either be removed completely from its installed position or relocated relative to the device each time wear in a different axis is to be measured. Such devices also tend to be relatively large and cumbersome. The present invention provides a device which is a fully portable light-weight apparatus that precisely measures bearings in two axes. When employed for the purpose of assessing bearing wear, the invention is capable of obtaining the measurement in confined spaces, without the need to remove the bearing from its fully installed position or reorient the bearing housing to facilitate both measurements. By using the disclosed apparatus, a user may ascertain the serviceability of a bearing by detecting the level of wear in the bearing allowing timely replacement and/or repair.

The invention claimed is:

1. A bearing wear measurement device for measuring the movement, due to wear, between a bearing and a bearing housing, the device comprising a body, partially enclosing a controllably movable indicator plate, a mandrel mountable on the indicator plate for the securing of the bearing, the axis of the mandrel defining an axial direction, a radial direction being perpendicular to the axial direction, a clamp for securing the bearing housing relative to the device, an indicator for displaying the movement of the indicator plate relative to the body, first controls for substantially restricting or allowing movement of the mandrel and therefore the indicator plate relative to the body in either or both axial and radial directions, and second controls for moving the indicator plate relative to the body in both the axial and radial directions, said movement being indicated on the indicator to provide a measurement of the axial and radial distance in movement between the bearing and the bearing housing, wherein the indicator plate includes an indicator interface, an axial actuator receptacle, a radial actuator receptacle, a radial lock receptacle and an axial lock receptacle.

2. The device according to claim 1, wherein the mandrel is an expanding mandrel.

3. The device according to claim 1, wherein the indicator is arranged to show wear measurements with a tolerance of 0.02 mm in both the axial and radial directions.

4. The device according to claim 1, wherein the indicator interface is a surface arranged at one end of the indicator plate at an angle between 25 and 65 degrees relative to the axis of the mandrel.

5. The device according to claim 4, wherein the angle is 45 degrees.

6. The device according to claim 1, wherein the clamping means includes an insert to prevent damage to the bearing housing.

7. The device according to any preceding claim 1, wherein the second controls include an axial actuator comprising an eccentric cam arranged to operate the movement of the indicator plate within the body of the device in the axial direction.

8. The device according to any preceding claim 1, wherein the second controls include a radial actuator comprising an eccentric cam arranged to operate the movement of the indicator plate within the body of the device in the radial direction.

9. A method of measuring wear in a bearing, the method comprising the steps of providing a device according to claim 1; providing a bearing including a bearing housing, to be measured; placing the mandrel in the bearing and expanding it until the mandrel cannot move relative to the bearing; clamping the bearing housing in the clamp; operating the first controls so the indicator plate can move in an axial direction but not in a radial direction; operating the second controls to move the indicator plate in the axial direction such that the distance between the two extremes of movement of the bearing relative to the bearing housing in the axial direction is indicated on the indicator.

10. The method of claim 6 further comprising the steps of operating the first controls so the indicator plate can move in a radial direction but not in an axial direction; operating the second controls to move the indicator plate in the radial direction such that the distance between the two extremes of movement of the bearing relative to the bearing housing in the radial direction is indicated on the indicator.

* * * * *